United States Patent
Balachandran et al.

(10) Patent No.: US 12,483,813 B2
(45) Date of Patent: Nov. 25, 2025

(54) AGGREGATION OF MULTIPLEXED OPTICAL TRANSCEIVERS IN SERVER CHASSIS TO ESTABLISH FABRIC TOPOLOGY

(71) Applicant: Cisco Technology, Inc., San Jose, CA (US)

(72) Inventors: Jayaprakash Balachandran, Fremont, CA (US); Anant Thakar, Los Altos, CA (US); Bidyut Sen, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 18/098,616

(22) Filed: Jan. 18, 2023

(65) Prior Publication Data
US 2023/0362519 A1    Nov. 9, 2023

Related U.S. Application Data

(60) Provisional application No. 63/338,202, filed on May 4, 2022.

(51) Int. Cl.
*H04Q 11/00*        (2006.01)
*H04J 14/02*        (2006.01)
*H04L 49/1515*    (2022.01)

(52) U.S. Cl.
CPC ......... *H04Q 11/0005* (2013.01); *H04J 14/02* (2013.01); *H04J 14/0307* (2023.08);
(Continued)

(58) Field of Classification Search
CPC ........... H04Q 11/0005; H04Q 11/0067; H04Q 2011/0016; H04Q 2011/0052; H04Q 2011/0073; H04J 14/02; H04J 14/0307
(Continued)

(56) References Cited

U.S. PATENT DOCUMENTS 8,965,203 B1 * 2/2015 Vahdat ............... H04J 14/0282
398/79
2008/0266813 A1    10/2008 Carlisi et al.
(Continued)

OTHER PUBLICATIONS

Kachris, et al., "A Survey on Optical Interconnects for Data Centers," IEEE Communications Surveys and Tutorials, vol. 14 No. 4, Fourth Quarter 2012, 16 pages.
(Continued)

*Primary Examiner* — Li Liu
(74) *Attorney, Agent, or Firm* — Lee & Hayes, P.C.

(57) ABSTRACT

This disclosure describes multiplexed optical transceivers, such as DWDM multiplexer/demultiplexers, which are aggregated in a server chassis to establish a fabric topology interconnecting blade servers to a dedicated switch module. Blade servers installed in the server chassis can utilize not just Ethernet interfaces to connect to network segments, but also PCIe interfaces as well as a combination of Ethernet and PCIe interfaces. The aggregated optical transceivers multiplex and demultiplex wavelength-specific optical signals using a laser source, reducing power consumption over switched fabric ASICs. Servicing of the multiplexed optical transceivers is facilitated by installation and replacement of a laser source. Scaling and redundancy of fabric topology interconnects can be facilitated by selection of laser sources generating expanded ranges of discrete wavelengths. Furthermore, chassis management can be facilitated by configuring network controllers of blade servers to transport chassis management instructions over the fabric topology in-band over a network interface, rather than by an out-of-band pathway.

6 Claims, 11 Drawing Sheets

(52) U.S. Cl.
CPC ..... *H04L 49/1515* (2013.01); *H04Q 11/0067* (2013.01); *H04Q 2011/0016* (2013.01); *H04Q 2011/0052* (2013.01); *H04Q 2011/0073* (2013.01)

(58) Field of Classification Search
USPC .............................................. 398/48, 49, 58
See application file for complete search history.

(56) References Cited

U.S. PATENT DOCUMENTS

| | | |
|---|---|---|
| 2010/0049822 A1 | 2/2010 | Davies et al. |
| 2010/0106871 A1 | 4/2010 | Daniel |
| 2011/0310917 A1* | 12/2011 | Krishnamoorthy .. H04B 10/506 372/23 |
| 2015/0189408 A1* | 7/2015 | Chen ................... H04J 14/0267 398/49 |
| 2017/0019168 A1 | 1/2017 | Menard et al. |
| 2017/0019305 A1* | 1/2017 | Chan ................... H04L 12/6418 |
| 2017/0134217 A1 | 5/2017 | Ahmed et al. |
| 2017/0134836 A1* | 5/2017 | Sindhu ............... H04Q 11/0005 |
| 2018/0231726 A1 | 8/2018 | Mizuno et al. |
| 2019/0036608 A1* | 1/2019 | Leigh ................. H04B 10/2581 |
| 2019/0157837 A1* | 5/2019 | Doussiere ............... H01S 5/021 |
| 2019/0158186 A1* | 5/2019 | Schmogrow ........ H04J 14/0298 |
| 2019/0158209 A1* | 5/2019 | Lin ....................... H01S 5/4087 |
| 2021/0203704 A1* | 7/2021 | Pohl ...................... A63F 13/355 |
| 2021/0211214 A1* | 7/2021 | Bordogna ................. G06F 1/14 |
| 2021/0405499 A1* | 12/2021 | Srinivasan ........... H04B 10/503 |
| 2024/0072896 A1* | 2/2024 | Wei .................. H04B 10/25753 |

OTHER PUBLICATIONS

Invitation to pay additional fees and, where applicable, protest fee mailed Aug. 11, 2023 for PCT Application No. PCT/US23/21017, 15 pgs.

PCT Search Report and Written Opinion mailed Oct. 2, 2023 for PCT application No. PCT/US23/21017, 19 pages.

Schares et al., "Optics in Future Data Center Networks," IEEE Computer Society, 2010 18th IEEE Symposium on High Performance Interconnects, 5 pages.

* cited by examiner ated computing, distributed memory fabrics, composable architectures, and the like. Therefore, there is a need for alternatives to dedicated switching of server chassis data packet fabric which is not bound by the limitations and tradeoffs of switch ASIC hardware design.

AGGREGATION OF MULTIPLEXED OPTICAL TRANSCEIVERS IN SERVER CHASSIS TO ESTABLISH FABRIC TOPOLOGY

CROSS REFERENCE TO RELATED APPLICATIONS

This application claims priority to U.S. Provisional Patent Application No. 63/338,202, filed May 4, 2022, the entire contents of which are incorporated herein by reference.

TECHNICAL FIELD

The present disclosure relates generally to photonic integrated circuits, and the integration thereof into a server chassis to aggregate multiplexed optical transceivers interconnecting multiple blade servers and a dedicated switch module by a fabric topology.

BACKGROUND

Blade servers are modular computing servers which include minimal components such as one or more processors, memory, and a network controller, housed in a compact form factor. Blade servers are configured to be installed in any of multiple uniquely identified physical slots of a server chassis, and to communicate with a server chassis over couplings by one or more ports and some number of connector pins to a backplane of the server chassis. Each blade server is further configured to send and receive data packet traffic over an Ethernet interface to the chassis backplane, where data packets from each blade server are forwarded over one or more networks by one or more switches of the server chassis.

Blade servers send Ethernet frames, encapsulated with network layer headers, to a switch module for forwarding over network segments to network devices of other network domains. A switch module can be integrated into a server chassis or installed in a server chassis, and can be configured to forward Ethernet frames sent from any number of blade servers installed in the server chassis. Rather than interconnect each blade server to the switch module by a point-to-point topology, a server chassis further includes a Clos switched fabric, wherein orthogonally interconnected line cards and fabric cards allow each blade server to communicate with the switch module by an equidistant path through the switched fabric.

However, as a typical server chassis houses eight to ten blade servers, bandwidth of a Clos switched fabric can be oversubscribed; i.e., by design, not all blade servers can transmit data at full rates, but queuing and latency can increasingly result as more blade servers increase outbound data transmission. Furthermore, application-specific integrated circuits ("ASICs") of line cards and fabric cards making up a switched fabric consume power at substantial rates according to hardware design, and such power consumption is likely to increase in future hardware designs. Such latency and power costs are treated as tradeoffs in server chassis hardware design.

Moreover, dedicated switching of server chassis data packet traffic is designed in accordance with Ethernet packet transport architectures, but Ethernet is not the only data fabric solution for server chassis applications, and Ethernet is not always the best data solution for interconnecting computing systems in computing applications such as accelerated computing, distributed memory fabrics, composable

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
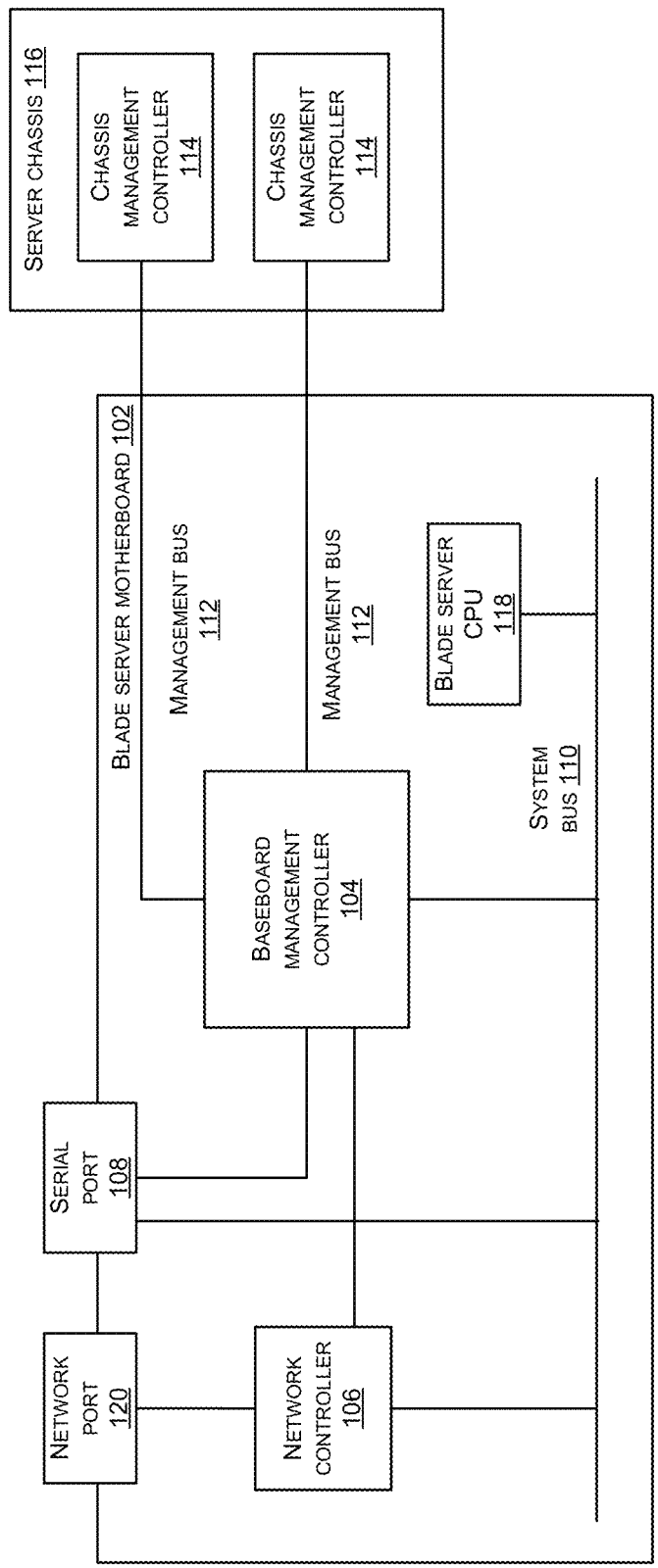
FIG. 1 illustrates a schematic layout of a blade server motherboard, a server chassis, and a switch module.

This disclosure describes multiplexed optical transceivers, such as DWDM multiplexer/demultiplexers, which are aggregated in a server chassis to establish a fabric topology interconnecting blade servers to a dedicated switch module.

A server chassis includes a plurality of optical transceivers configured to multiplex wavelength-specific optical signals at a plurality of discrete wavelengths. The server chassis further includes a transmitting optical fiber connected to at least one of the plurality of optical transceivers, a receiving optical fiber connected to at least one of the plurality of optical transceivers, and an optical port, wherein the transmitting optical fiber and the receiving optical fiber are each connected to the optical port. The server chassis further includes a laser source configured to generate a laser beam comprising the plurality of discrete wavelengths. The server chassis further includes a plurality of blade servers, wherein each blade server of the plurality of the blade servers is connected by one or more network ports to each optical transceiver of the complementary set of optical transceivers.

An optical transceiver can be a dense wavelength division multiplexing ("DWDM") multiplexer/demultiplexer. The plurality of optical transceivers can include a complementary set of optical transceivers which have a plurality of channels, wherein the plurality of discrete wavelengths include at least as many wavelengths as the plurality of channels. The one or more network ports can include an Ethernet interface and a PCIe interface.

Additionally, a blade server is configured to forward, by a network controller of the blade server, data packet traffic over a plurality of optical transceivers of a server chassis, and forward, by the network controller, chassis management information over the plurality of optical transceivers of the server chassis. The blade server can be configured to receive, by a baseboard management controller ("BMC") of the blade server, the chassis management information over a network controller sideband interface ("NC-SI"). The blade server can be elected by a chassis management controller ("CMC") of the server chassis in accordance with a systems-management specification to receive chassis management information of each other blade server installed in the server chassis. Alternatively, the blade server can be configured to receive, by the network controller, the chassis management information over a serial gigabit media independent interface ("SGMII").

The network controller can be a network interface controller or a virtual network interface controller. The chassis management information forwarded over the plurality of optical transceivers can include Ethernet frames tagged with a VLAN tag or a VN-tag.

Additionally, the techniques described herein may be performed by a system and/or device having non-transitory computer-readable media storing computer-executable instructions that, when executed by one or more processors, performs the methods described above.

Example Embodiments

According to example embodiments of the present disclosure, blade servers are installed in any number of physical slots of a backplane of a server chassis, and a server chassis is in communication with a switch module. By way of example, a server chassis can include an integrated top-of-rack ("TOR") switch module. Such a server chassis having blade servers installed can be configured as one of any number of server chassis components of an access layer network infrastructure, or an edge layer network infrastructure, of a multi-tier data center infrastructure architecture.

Data traffic in the form of packets can be carried over one or more network segments established between some number of ports of network devices. In a data center infrastructure architecture, such network segments can be categorized as, for example, layer 2 network segments and layer 3 network segments according to the Open Systems Interconnection ("OSI") model.

Network segments can be implemented as Ethernet network segments. According to Ethernet implementations, Internet Protocol ("IP") packets are encapsulated as frames and forwarded over one or more layer 2 network segments and layer 3 network segments. While generally frames are forwarded by switches over layer 2 network segments while forwarded by routers over layer 3 network segments, in a data center infrastructure architecture, switches perform forwarding over both layer 2 and layer 3 network segments.

Furthermore, alternatively and/or additionally to Ethernet implementations of network segments, in a data center infrastructure architecture, network segments can be implemented as Peripheral Component Interconnect Express ("PCIe") network segments. It should be understood that "PCIe network segments," according to the present disclosure, are not to be confused with the use of local PCIe interconnections internal to a computing system to implement input/output data buses, such as system buses as described subsequently. Rather, whereas local PCIe interconnections in a computing system can provide an electronic communication interface between, for example, a CPU and a network controller (as described subsequently), a computing system can include local PCIe implementations of data buses without including external PCIe network segments between different network devices.

For the purpose of understanding example embodiments of the present disclosure, it should be understood that both Ethernet network segments and PCIe network segments can be physically implemented as electrical interfaces or optical interfaces which provide point-to-point links. An Ethernet network segment is implemented as an electrical wire or an optical fiber, which can be implemented as a coaxial cable, twisted pair cable, fiber optic cable, and the like. A PCIe network segment is implemented as a cable including some number of parallel wires, the wires including one to sixteen parallel lanes. In each case, such a point-to-point topology requires a direct link to connect a network device to other network devices. Therefore, the physical wiring of Ethernet network segments and/or PCIe network segments for each blade server of a server chassis requires at least an outbound cable connection or outbound bus connection from each blade server.

It should be understood that a multi-tier data center architecture includes a combination of any number of underlying network devices which are configured to transport data packets received over Ethernet network segments and/or PCIe network segments according to decision-making logic of a dedicated switch module, such as a TOR switch module as described above. By way of example, network devices generally forward data packets according to next-hop forwarding. In next-hop forwarding, an ASIC of a network device, configured by computer-executable instructions, may evaluate, based on routing table information, a next-hop forwarding destination of a data packet received on an inbound network interface of a network device; and may forward the data packet over a network segment to the determined destination over an outbound network interface of the network device.

FIG. 1 illustrates a schematic layout of a blade server motherboard, a server chassis, and a switch module. The blade server motherboard 102 includes at least a baseboard management controller ("BMC") 104 and a network controller 106. A BMC 104 includes a microcontroller, i.e., an integrated circuit composed of at least one or more central processing units, memory, some number of input/output ("I/O") pins, and an analog-to-digital converter ("ADC"). A BMC 104 is configured by one or more sets of computer-readable instructions stored on a computer-readable storage medium to perform computations.

It should be understood that a BMC 104 constitutes a first computing system contained within the blade server, which constitutes a second computing system. Central processing units, memory, and I/O pins of the BMC 104 (not illustrated, but which should be understood as being encompassed by the BMC 104 in FIG. 1) are independent from central processing units, memory, and I/O pins of the blade server motherboard 102 (not illustrated, except for the blade server CPU 118 as described subsequently, but which should be understood as being encompassed by the blade server motherboard 102). The BMC 104 and its elements are powered by a power source of the blade server; however, the BMC 104 is configured by firmware to perform computations independent of the blade server and independent of any elements of the blade server.

I/O pins of the BMC 104 are in electronic communication with a chipset of a blade server motherboard 102, the chipset providing a plurality of connector pins, including connector pins configured to draw power from blade servers, to exchange data with blade servers, and for various other functions as defined by blade server manufacturers.

I/O pins of a BMC 104 are further in electronic communication with other elements of a blade server motherboard 102, which include the network controller 106, as well as elements such as a serial port 108, any number of data buses, and any number of integrated circuits. The BMC 104, in conjunction with these elements of a blade server motherboard 102, is configured as an autonomous management subsystem of the blade server 102. The BMC 104 is configured to provide interfaces which control the configuration and operation of the blade server, based on computing inputs from the network controller 106, a serial port 108, data buses, integrated circuits, and the like. Such inputs can be processed at interfaces of the BMC 104 provided in accordance with a systems-management specification, such as Intelligent Platform Management Interface ("IPMI").

The data buses can include a system bus 110 of the blade server motherboard 102. The system bus 110 is a data bus connecting a central processing unit ("CPU") of the blade server motherboard 102 (a "blade server CPU 118") and memory of the blade server CPU 118, as well as connecting the blade server CPU 118 with other elements of the blade server motherboard 102, including the BMC 104, the network controller 106, and the serial port 108, in electronic communication.

The data buses can further include any number of management buses 112 (such as, by way of example, a system management bus ("SMBus"), a management data input/output ("MDIO") bus, an Intelligent Platform Management Bus ("IPMB"), an Intelligent Platform Management Controller ("IPMC") bus, and other such data buses which are narrower in bandwidth than the system bus 110).

Each such data bus should be understood as an electronic communication interface which provides electronic communication between a CPU of the BMC 104 and other elements of the BMC; between the BMC 104 and a chassis management controller ("CMC") 114 of a server chassis 116; and/or between the BMC 104 and a computing system external to the server chassis 106 (such as a local computing system physically interfaced with the serial port 108, or a remote computing system interfaced with the network controller 106 by an Ethernet connection and/or a PCIe connection; not illustrated). An external computing system can be operated by a server administrator by one or more input interfaces of the remote computing system.

It should be understood that a CMC 114 constitutes a third computing system contained within the server chassis. The CMC 114 further includes central processing units, memory, and I/O pins (not illustrated, but which should be understood as being encompassed by the CMC 114 in FIG. 1). The CMC 114 and its components are powered by a power source of the server chassis; however, the CMC 114 is configured by firmware to perform computations independent of any elements of the server chassis.

It should further be understood that a CMC is a component of an I/O module ("IOM") of a server chassis, and that each server chassis can include two IOMs which are redundant to each other in functionality. Therefore, two IOMs of a server chassis can provide two CMCs, where both CMCs are in electronic communication with the BMC 104, and both CMCs are configured substantially similarly. Subsequently, it should be understood that a CMC as described herein can refer to either CMC of a server chassis interchangeably, except where both CMCs of a server chassis are referenced together; any steps described subsequently as being performed by a CMC can be performed substantially similarly by one or both CMCs of a server chassis.

I/O pins of the CMC 114 are in electronic communication with a chipset of a server chassis board 116, the chipset providing a plurality of connector pins, including connector pins configured to draw power from the server chassis, to exchange data with components of the server chassis, and for various other functions as defined by server chassis manufacturers.

I/O pins of a CMC 114 are further in electronic communication with other elements of a server chassis board 116, which include a server chassis network controller, as well as elements such as any number of data buses and any number of integrated circuits. The CMC 114, in conjunction with these elements of a server chassis, is configured as an autonomous management subsystem of the server chassis. The CMC 114 is configured to provide interfaces which control the configuration and operation of the server chassis, based on computing inputs from the network controller, data buses, integrated circuits, and the like. Such inputs can be processed at interfaces of the CMC 114 provided in accordance with a systems-management specification, such as IPMI.

A BMC 104 and a CMC 114 can be connected in electronic communication by a management bus 112 of a blade server motherboard 102 which interconnects with a server chassis board 116. A BMC 104 and an external computing system can be connected in electronic communication by a management bus 112 of a blade server motherboard 102 which interconnects with a network controller 106 or a serial port 108. Moreover, a BMC 104 and an external computing system can be connected in electronic communication by a system bus 110.

Likewise, a CMC 114 can be connected in electronic communication to an external computing system by in-band (i.e., a connection by a system bus 110 or a network interface) or out-of-band (i.e., a connection by any other lower-bandwidth pathway, such as a management bus 112 or an I/O pin) pathways, and can be connected to any number of sensors of the server chassis board 116. A CMC 114 can be connected to any number of sensors, such as hardware health sensors and the like, by I/O pins and/or by management buses 112. The CMC 114 can be configured by firmware to receive measurements from such sensors, and to report the received measurements to an external computing system as described above. Such measurements can indicate status, performance, health, and such characteristics of the server chassis or elements thereof. In this fashion, an external computing system is configured to receive and report sensor measurements collected by the CMC 114. A server administrator operating the external computing system can review the sensor measurements, determine status, performance, health, and such characteristics of the server chassis, and send chassis management instructions to the CMC 114 over a management bus 112 to configure elements of the server chassis to perform various tasks, thereby adjusting status, performance, health, and such characteristics of the server chassis without necessarily physically accessing the server chassis.

For example, an out-of-band pathway such as an MDIO bus can connect the CMC 114 to a laser source and a laser source health sensor as shall be described subsequently, enabling the CMC 114 to send Ethernet frames and/or PCIe packets (as shall be described subsequently) to request information from the laser source health sensor and receive information from the laser source health sensor, as well as to power a laser source on and off for reasons as shall be described subsequently.

Furthermore, the network controller 106 connects the blade server CPU 118 and the BMC 104 in communication with a network port 120. A network controller 106 can be integrated into the blade server motherboard 102, or can be in communication with the blade server motherboard 102 by a bus connection, such as a Peripheral Component Interconnect ("PCI") connection; an Industry Standard Architecture ("ISA") connection; a PCIe connection; an IEEE 1394 connection; a Universal Serial Bus ("USB") connection; and other such data bus connections. The network controller 106 (such as a network interface controller, or "NIC," or a virtual network interface controller, or "VIC") includes integrated circuits which are configured to send and receive data to other network devices in the form of packets (such as Ethernet frames and/or PCIe packets). The network controller 106 can send and receive packets over transceiver integrated circuits as described subsequently.

In a network device as a whole, transceiver integrated circuits underlying the sending and receiving functionality of ports according to network standards, such as local area network ("LAN") standards, may be each referred to as a physical layer circuit, commonly referred to as an "Ethernet PHY" or "PHY." The physical circuit design of each PHY may determine characteristics of a respective port of a network device, such as a bitrate of each respective port and the LAN standards which each respective port may support in sending and receiving packets. Subsequently, for ease of reference, a "port" according to example embodiments of the present disclosure shall refer to one or more integrated circuits of a PI-W which define transceiver functionalities of a respective port of a network device.

In one respect, the BMC 104 can configure the blade server CPU 118 to encapsulate Ethernet frames and/or encapsulate PCIe packets according to a network protocol, and cause the network controller 106 to forward encapsulated Ethernet frames and/or PCIe packets over one or more network segments from the network port 120.

For example, the blade server CPU 118 can be configured to encapsulate an Ethernet frame with an Ethernet header containing a destination MAC address, a source MAC address, and an EtherType, the EtherType including some number of bits which encode an indication of a network protocol.

For example, the blade server CPU 118 can be configured to encapsulate a PCIe packet with a PCIe header containing a destination address and a source address. The destination address and the source address can each be formatted according to Translation Layer Packet ("TLP") headers defined for data packet transport over PCIe interfaces, and/or according to any other header format defined to encapsulate data packets transported over PCIe interfaces.

The blade server CPU 118 can be configured to send an Ethernet frame and/or a PCIe packet encapsulated with an Ethernet header and/or a PCIe header from the network port 120 to a switch module for forwarding over a layer 2 network segment.

Furthermore, the blade server CPU 118 can be configured to further encapsulate an Ethernet frame and/or a PCIe packet with a network layer header containing a destination IP address and a source IP address. The blade server CPU 118 can be configured to send an Ethernet frame and/or a PCIe packet encapsulated with a network layer header from the network port 120 to a switch module for forwarding over a layer 3 network segment.

A switch module, such as a TOR switch, can be integrated into a server chassis or installed in a server chassis, and can be configured to forward Ethernet frames and/or PCIe packets sent from network ports of multiple blade servers. Since multiple blade servers are installed in different physical slots of a server chassis, to establish network segments between each blade server and the switch module, a server chassis must provide a physical network interface outbound from a network port of each blade server which is ultimately in electrical or optical connection with a network port of the switch module.

Likewise, a CMC 114 is connected in communication with a network port of the server chassis, and the CMC 114 is configured to forward encapsulated Ethernet frames and/or PCIe packets over one or more network segments from the network port of the server chassis to the switch module.

However, it is not desirable to interconnect each blade server and the switch module by a point-to-point topology. It is not practical to wire a separate cable, whether electrically or optically wired, from each blade server individually out of the server chassis and then into a TOR switch at the top of the server chassis, as this would highly complicate the physical arrangement of cables connected to the server chassis. An excess number of cables in data centers leads to a greater number of points of failure, increases the likelihood of human error in installation and servicing, unduly complicates physical planning of data centers, and can impede airflow, and thus impede cooling of computing components, inside the data center.

Whereas Clos fabric topologies exist to interconnect blade servers and a switch module without a point-to-point topology, Clos fabric topologies are implemented by orthogonal interconnections between line cards and fabric cards in a server chassis. Line cards and fabric cards are hardware modules which aggregate Ethernet PHYs, enabling Ethernet interfaces to be interconnected to other network devices; however, line cards and fabric cards do not exist for physical layer circuits which support PCIe interfaces (i.e., "PCIe PHYs"). The need to provide electrical wiring for up to sixteen lanes per PCIe interface makes it impractical to aggregate PCIe PHYs in a fashion similar to Ethernet PHYs.

To overcome this limitation, example embodiments of the present disclosure provide a server chassis aggregating multiplexed optical transceivers, the multiplexed optical transceivers interconnecting multiple blade servers and a dedicated switch module by a fabric topology. Such a server chassis can support the interconnection of multiple blade servers to other network devices by outbound PCIe network interfaces rather than outbound Ethernet network interfaces, or in parallel with outbound Ethernet network interfaces. The multiplexed optical transceivers provide a fabric topology which is interoperable with Ethernet interfaces, PCIe interfaces, as well as a mix thereof; the fabric topology is also effective to multiplex chassis management packet traffic alongside data packet traffic.

For the purpose of understanding the present disclosure, it should be understood that "PCIe network interfaces" refer to outbound network ports of a network controller, which include transceiver network interfaces over which the network controller sends and receives packets to other network devices. As mentioned above with reference to FIG. 1, a network controller 106 can also be in communication with the blade server motherboard 102 by a bus connection such as PCIe; it should be understood that PCIe connections between a network controller 106 and the blade server motherboard 102, as well as any other internal PCIe connections between components of the blade server motherboard 102, as well as connections between the blade server motherboard 102 and any other hardware expansion cards installed in a blade server, are not "PCIe network interfaces," as packets are not sent or received to other network devices over such PCIe connections.

Additionally, for the purpose of understanding the present disclosure, it should be understood that a "fabric topology" according to example embodiments of the present disclosure should be distinguished from the general concept of a "switched fabric," a switched fabric referring to any network topology wherein some number of network devices are interconnected by switched network segments, wherein traffic can be diverted in multiple paths at each switch.

Figure 2:
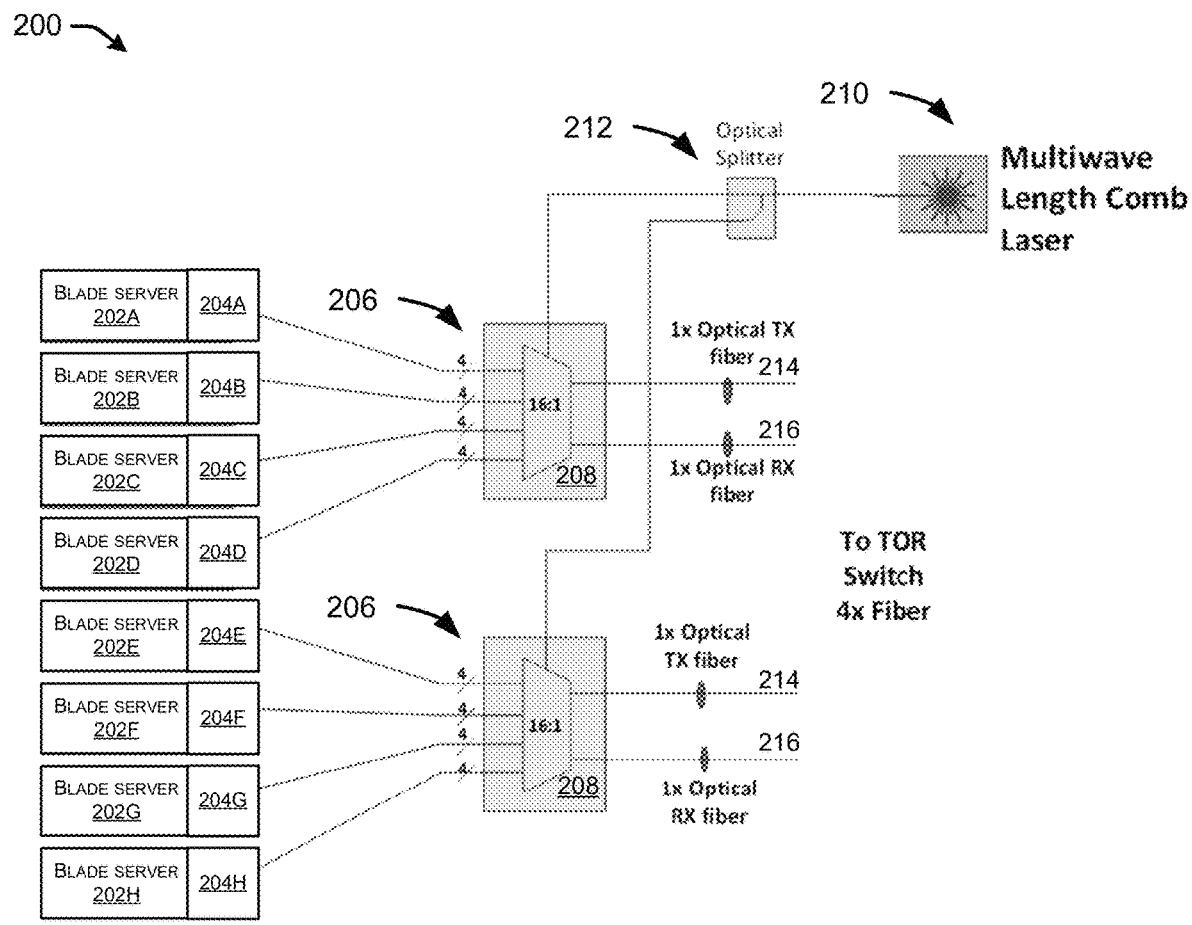
FIG. 2 illustrates a server chassis according to example embodiments of the present disclosure, the server chassis aggregating multiplexed optical transceivers, the multiplexed optical transceivers interconnecting multiple blade servers and a dedicated switch module by a fabric topology.

FIG. 2 illustrates a server chassis 200 according to example embodiments of the present disclosure, the server chassis aggregating multiplexed optical transceivers, the multiplexed optical transceivers interconnecting multiple blade servers and a dedicated switch module by a fabric topology.

Eight blade servers 202A through 202H are installed in slots of the server chassis 200. Each of the blade servers 202A through 202H has a network controller with a network port 204A through 202H as described above with reference to FIG. 1, and each respective network port can be an Ethernet interface or a PCIe interface, without limitation. Furthermore, each of the blade servers 202A through 202H can have both at least one Ethernet interface and at least one PCIe interface, without limitation.

The network ports 204A through 204H of each of the blade servers 202A through 202H are each optical communication by one or more optical fibers (which can be a single-mode optical fiber or a multi-mode optical fiber, without limitation) to a corresponding number of channels 206 of a dense wavelength division multiplexing ("DWDM") multiplexer/demultiplexer 208. By way of example, as illustrated in FIG. 2, each network port is connected to four channels 206 by four optical fibers, which can enable communication by PCIe specifications by providing a number of PCIe lanes as subsequently described.

A transponder at each channel 206, such as an optical serializer/deserializer ("SerDes"), can receive optical signals from the network ports and send optical signals to the network ports. Furthermore, a Pulse Amplitude Modulation 2-level ("PAM2") modulator, a Pulse Amplitude Modulation 4-level ("PAM4") modulator, or any other suitable optical modulator at each channel 206 modulates received optical signals to yield a wavelength-specific optical signal using a laser beam generated from a laser source (as described subsequently).

According to example embodiments of the present disclosure, the server chassis 200 includes a laser source 210. A laser source 210 is in optical connection to each DWDM multiplexer/demultiplexer 208 by an LC connector, an SC connector, or any other category of fiber optic connector. The laser source 210, which can be a comb laser, generates a laser beam made up of multiple discrete wavelengths, which transponders of the DWDM multiplexer/demultiplexer utilizes to generate wavelength-specific optical signals. An optical splitter 212 splits the laser beam into one separate beam for each DWDM multiplexer/demultiplexer. By way of example, the laser beam is made up of at least as many discrete wavelengths as channels of a DWDM multiplexer/demultiplexer.

The laser source 210 is powered by a power source of the server chassis 200, and the laser source 210 is physically mounted in the server chassis 200 at an outer face of the server chassis, such that the laser source 210 can be installed in and removed from the server chassis 200 without powering down the server chassis in order to access its internals. After the laser source 210 degrades in performance from long-term usage, a data center administrator can remove a degraded laser source and install a new laser source without accessing the internal of the server chassis.

Figure 3:
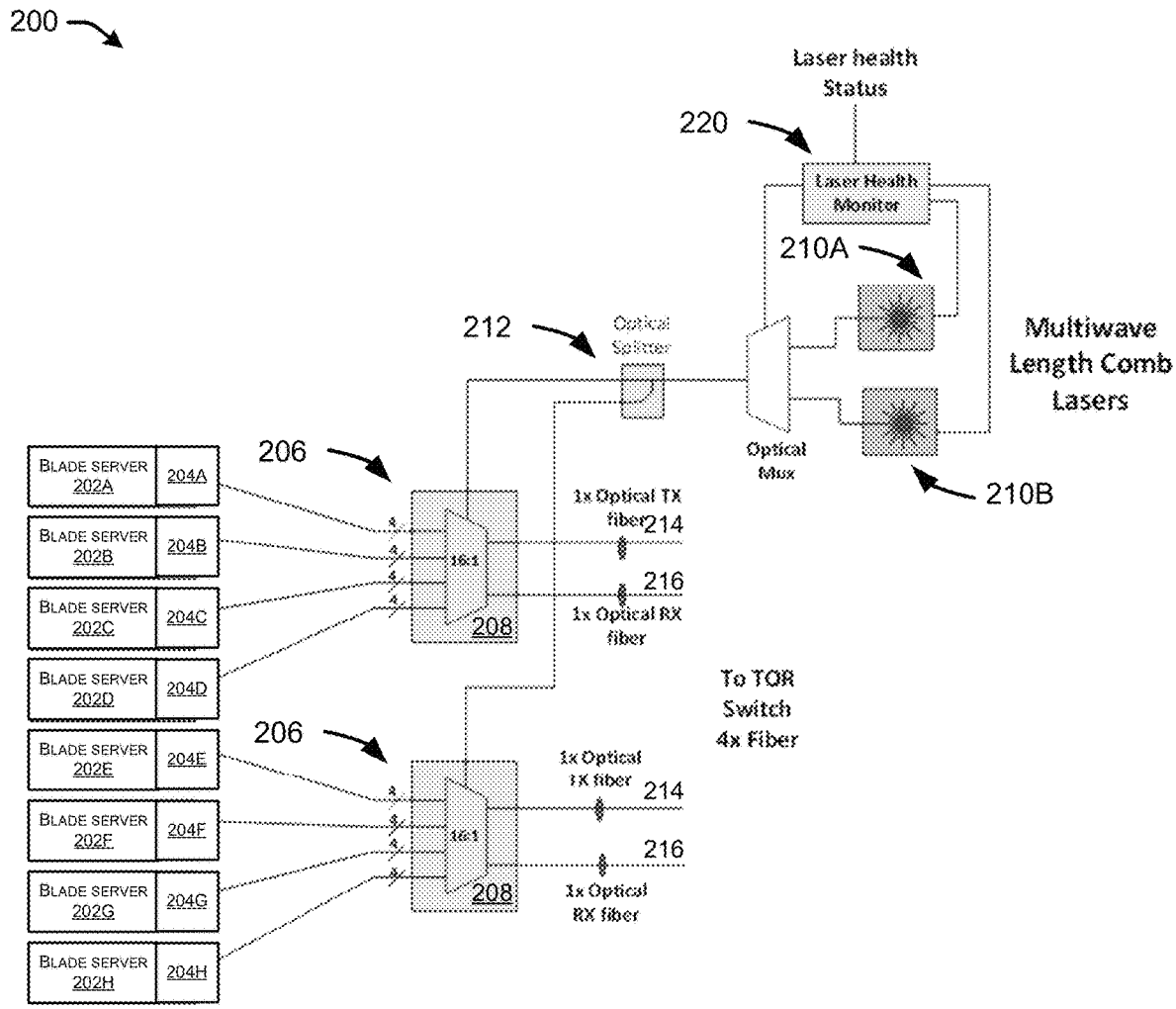
FIG. 3 illustrates the server chassis of FIG. 2 with two laser sources, where both laser sources share a same optical connection to each DWDM multiplexer/demultiplexer through an optical splitter.

According to example embodiments of the present disclosure, the server chassis 200 can include more than one laser source. FIG. 3 illustrates the server chassis 200 of FIG. 2 with two laser sources 210A and 210B, where both laser sources 210A and 210B share a same optical connection to each DWDM multiplexer/demultiplexer 208 through an optical splitter 212, as described above. The laser sources 210A and 210B are configured such that no more than one is powered on at the same time. Thus, upon either of the laser sources degrading in performance, it can be powered off, with the other being powered on in its stead, enabling the performance-degraded laser source to be replaced without interrupting the interconnection provided by the multiplexed optical transceivers.

As described above, an out-of-band pathway such as an MDIO bus can connect the CMC 114 to a laser source 210, or to both laser sources 210A and 210B, and to a laser source health sensor 220, by I/O pins and/or by management buses 112. The CMC 114 can be configured by firmware to receive measurements from such sensors, such as temperature measurements or electrical current measurements, and to report the received measurements to an external computing system as described above. Over the course of laser source operation, temperature, electrical current, and such measurements should remain substantially constant, and deviations in measurements can indicate degradation in performance or failure. In this fashion, an external computing system is configured to receive and report sensor measurements collected by the CMC 114. A server administrator operating the external computing system can review the sensor measurements, determine degradation or failure based on deviations in measurements, and send inputs to the CMC 114 over a management bus 112 to power the laser sources on and off to prepare a degraded laser sensor for replacement without necessarily physically accessing the server chassis.

The DWDM multiplexer/demultiplexer 208 furthermore has an outbound transmitter optically connected to a transmitting ("Tx") optical fiber 214, and an inbound receiver optically connected to a receiving ("Rx") optical fiber 216. The DWDM multiplexer/demultiplexer 208 multiplexes multiple wavelength-specific optical signals into a single multiple-wavelength optical signal for transmission over the Tx optical fiber, and demultiplexes multiple-wavelength optical signals received over the Rx optical fiber.

It should be understood that, due to each of the blade servers 202A through 202H being physically installed in separate slots of the server chassis 200, each network port 204A through 204H is connected to a channel 206 through a separate optical fiber. A fabric topology is established by the connections from blade servers to each DWDM multiplexer/demultiplexer, and such fabric topologies are described in further detail subsequently.

Figure 4:
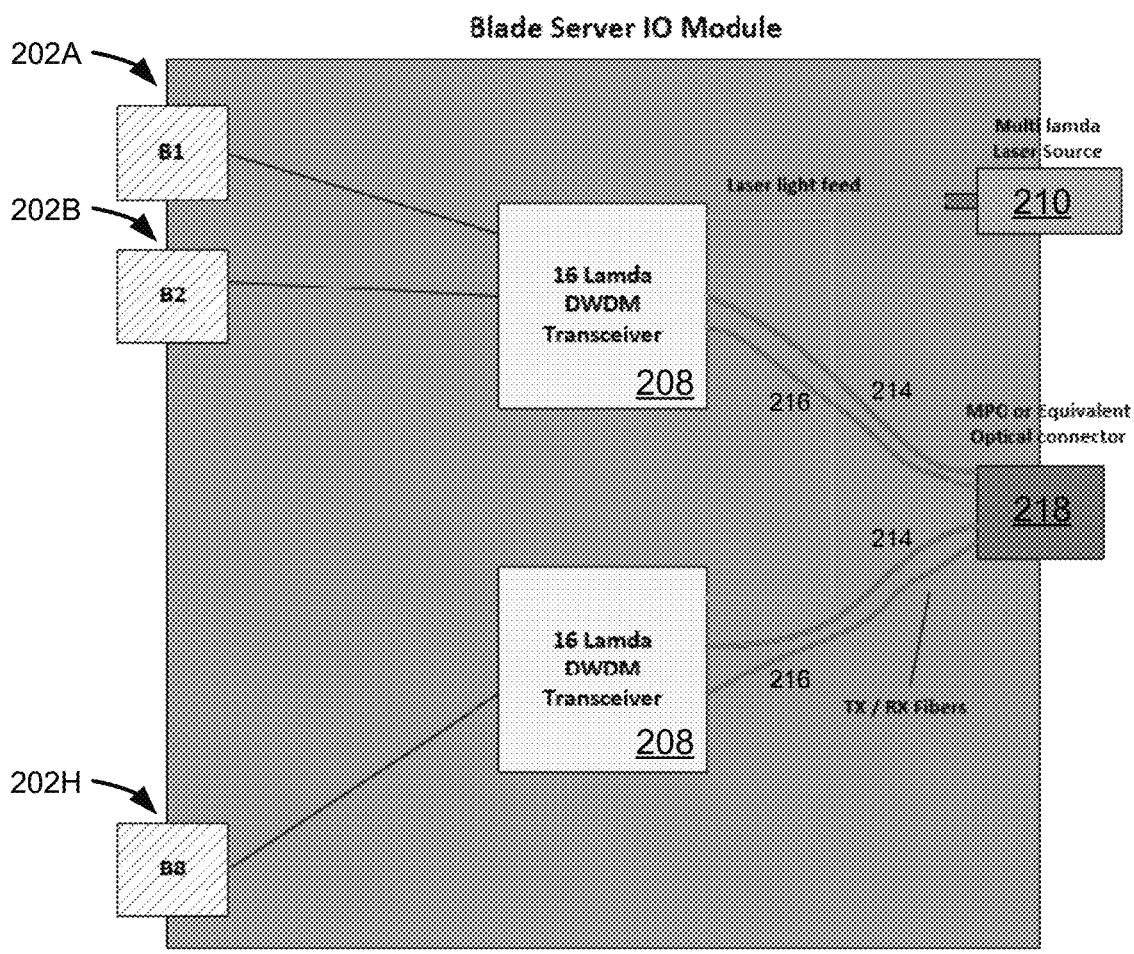
FIG. 4 illustrates the connection of Tx optical fibers and Rx optical fibers of multiple DWDM multiplexer/demultiplexers to an optical port of the server chassis.

However, the transmitter and the receiver of one or more DWDM multiplexer/demultiplexers 208 can be connected to separate optical fibers 214 and 216 bundled in a same cable, which can connect to an optical port on the outside of the server chassis 200. By way of example, an optical port can be a multi-fiber push on ("MPO") connector, which provides physical connectors for multiple optical fibers in a same cable. FIG. 4 illustrates the connection of Tx optical fibers 214 and Rx optical fibers 216 of multiple DWDM multiplexer/demultiplexers 208 to an optical port 218 of the server chassis 200.

Furthermore, it should be understood that, by an optical port 218 as described above, the Tx optical fiber 214 and the Rx optical fiber 216 can each be connected to another DWDM multiplexer/demultiplexer (not illustrated) which is in optical communication with one or more dedicated switch modules (such as one or more TOR switches; not illustrated) of the server chassis. The blade server-side DWDM multiplexer/demultiplexer 208 transmits multiplexed optical signals from blade servers over the Tx optical fiber to the switch-side DWDM multiplexer/demultiplexer, which demultiplexes the transmitted optical signals. The switch-side DWDM multiplexer/demultiplexer transmits multiplexed optical signals from the one or more dedicated switch modules over the Rx optical fiber to the blade server-side DWDM multiplexer/demultiplexer 208, which demultiplexes the received optical signals and transmits them to the blade servers 202A through 202H.

As illustrated in FIG. 2, each DWDM multiplexer/demultiplexer 208 is a 16:1 multiplexer/demultiplexer, wherein optical signals are received and sent over sixteen channels; sixteen optical signals are multiplexed into one optical signal; and one optical signal is demultiplexed into sixteen optical signals. However, according to example embodiments of the present disclosure, DWDM multiplexer/demultiplexers are not limited to sixteen channels; alternatively, a DWDM multiplexer/demultiplexer can have four channels, eight channels, thirty-two channels, and the like, without limitation.

According to example embodiments of the present disclosure, the number of channels of a DWDM multiplexer/demultiplexer is a multiple of the number of blade servers, providing a sufficient number of channels such that, for any blade server is connected by a PCIe interface, at least two lanes are provided to establish one sending lane and one receiving lane according to PCIe specifications. For example, a server chassis according to example embodiments of the present disclosure can provide a PCIe interface of a blade server with four DWDM multiplexer/demultiplexer channels, two serving as PCIe sending lanes and two serving as PCIe receiving lanes. Moreover, as illustrated in FIG. 2, the server chassis 200 can include more than one DWDM multiplexer/demultiplexer 208, each of which may or may not include a same number of input channels.

To provide further redundancy in the event of failures, a server chassis according to example embodiments of the present disclosure can provide a PCIe interface of a blade server with one redundant PCIe sending lane and one redundant PCIe receiving lane for each active sending lane and receiving lane; these redundant lanes can be provided by a redundant DWDM multiplexer/demultiplexer, which is separately optically connected to the blade server in a similar fashion as illustrated in FIG. 2.

An IOM of the server chassis 200 is configured to, following a boot-up sequence of the IOM, transmit to a switch module, by an out-of-band pathway as described above, configuration parameters of PCIe interfaces of each blade server installed in the server chassis 200. By way of example, the configuration parameters transmitted to a switch module can include number of blade servers installed; number of lanes (a multiple of 2, including sending and receiving lanes) requested by each blade server for a PCIe interface; channel ratio per DWDM multiplexer/demultiplexer; and a set of discrete wavelengths. Number of requested lanes can further include a minimum number of lanes and a maximum number of lanes, to permit suboptimal allocations of lanes.

A switch module is configured to, based on the configuration parameters and for each blade server, allocate a maximum number of lanes requested or allocate less than a maximum number of lanes requested for each blade server (but numbering at least one lane), depending on availability of yet-to-be-allocated DWDM multiplexer/demultiplexer channels across the server chassis. The switch module is configured to transmit lane allocations to each respective blade server, configuring a media access controller ("MAC") of each blade server to configure each blade server to send and receive packets over a PCIe interface in accordance with a number of allocated lanes.

Moreover, in the event that blade server connections are distributed across a fabric topology (as described subsequently), the switch module is configured to aggregate multiple optical signals of discrete wavelengths for each blade server, forwarding an aggregated, multiple-wavelength optical signal for one blade server, to achieve greater availability of switching bandwidth.

According to example embodiments of the present disclosure, a fabric topology is established by connections from each blade server 202A through 202H to each DWDM multiplexer/demultiplexer 208. FIGS. 2 and 4 illustrate example embodiments of the present disclosure wherein each blade server is connected to one DWDM multiplexer/demultiplexer. However, given that a blade server can include multiple network ports (which can include Ethernet interfaces and/or PCIe interfaces), each blade server can be connected from multiple network ports to channels of multiple DWDM multiplexer/demultiplexers, as shall be illustrated in subsequently described Figures. The number of possible connections from blade servers to DWDM multiplexer/demultiplexers depends on the number of channels of each DWDM multiplexer/demultiplexer, as well as the number of DWDM multiplexer/demultiplexers included in a server chassis.

It should be understood that, in the subsequent Figures, any number of redundant DWDM multiplexer/demultiplexers can be present in addition to those illustrated, which are separately optically connected to the blade server in a similar fashion as illustrated in the subsequent Figures.

Figure 5:
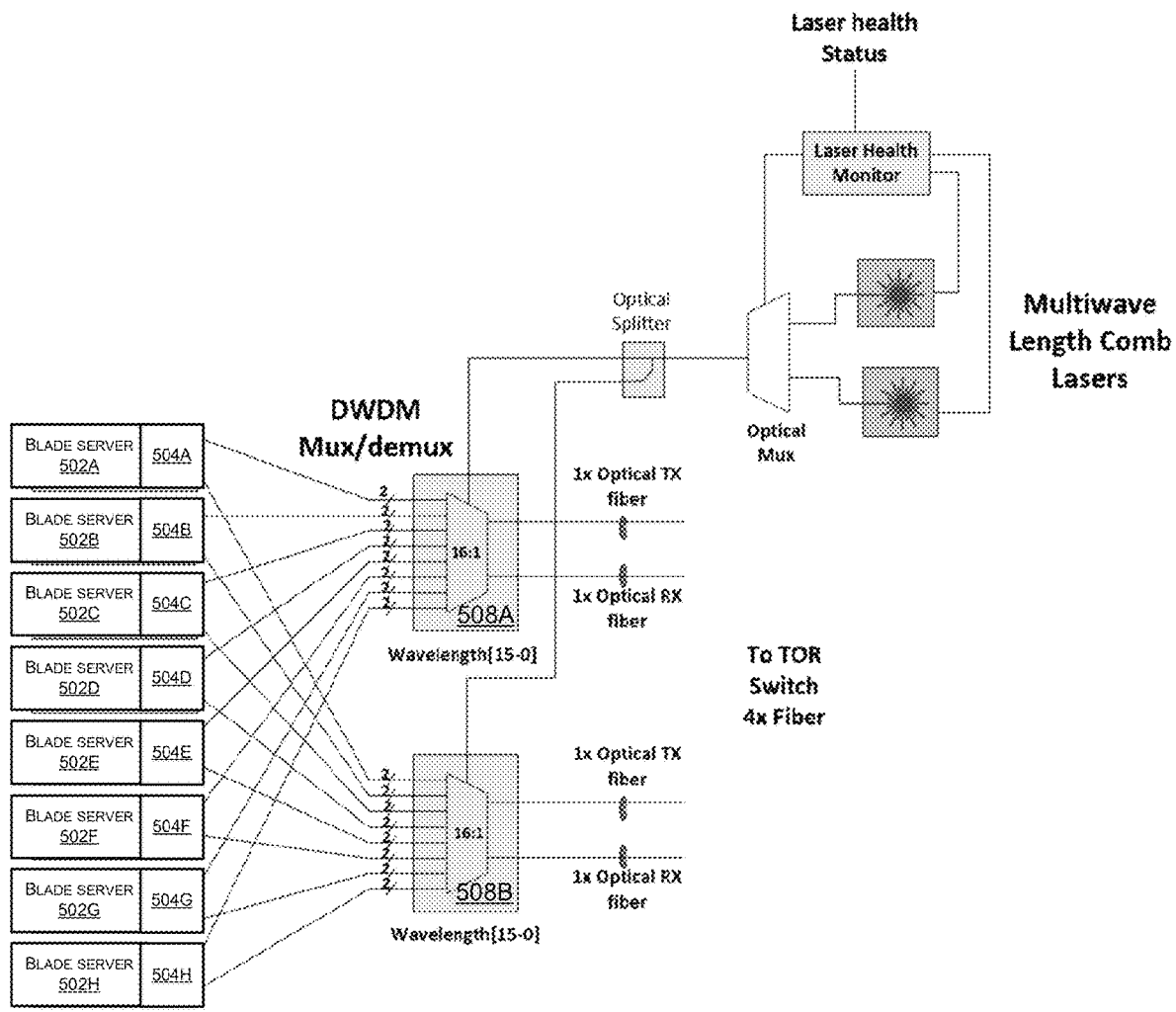
FIG. 5 illustrates a server chassis implementing a two-way distributed interconnect fabric topology according to an example embodiment of the present disclosure.

FIG. 5 illustrates a server chassis 500 implementing a two-way distributed interconnect fabric topology according to an example embodiment of the present disclosure. In the server chassis 500, blade servers 502A through 502H are each connected to four channels of DWDM multiplexer/demultiplexers 508A and 508B by four optical fibers, where two fibers are connected to channels of 508A and two fibers are connected to channels of 508B. By distributing one interconnection of the fabric topology across two separate DWDM multiplexer/demultiplexers, each blade server will retain an interconnection to the switch module through the fabric topology even if optical fiber links fail for any one DWDM multiplexer/demultiplexer. Thus, the server chassis 500 provides improved failure tolerance in a fabric topology.

Figure 6:
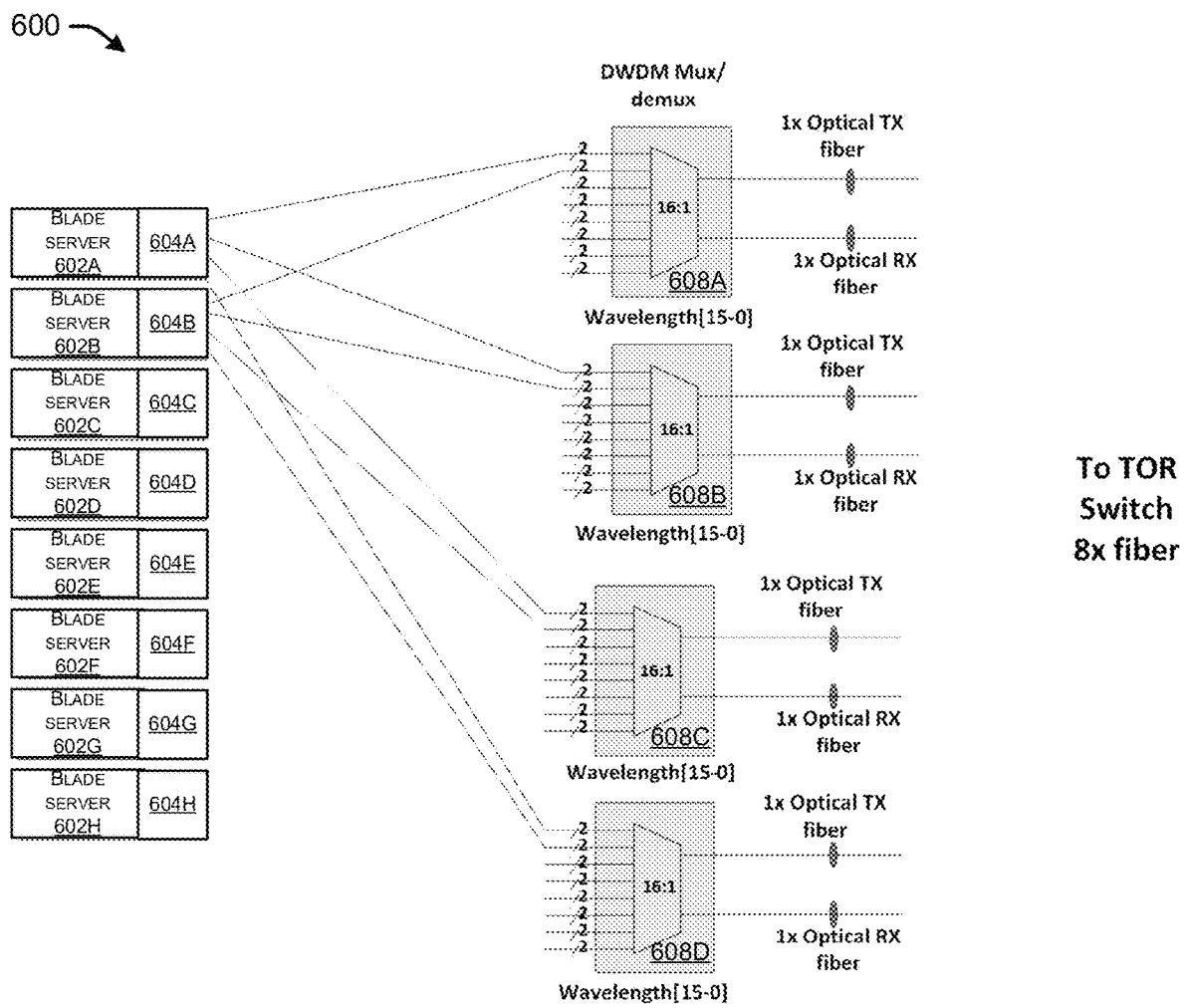
FIG. 6 illustrates a server chassis implementing a four-way distributed interconnect fabric topology according to an example embodiment of the present disclosure.

FIG. 6 illustrates a server chassis 600 implementing a four-way distributed interconnect fabric topology according to an example embodiment of the present disclosure. In the server chassis 600, blade servers 602A through 602H are each connected to eight channels (rather than four channels, thereby expanding sending and receiving bandwidth over a network port of each blade server) of DWDM multiplexer/demultiplexers 608A, 608B, 608C, and 608D by eight optical fibers, where two fibers are connected to channels of each of 608A, 608B, 608C, and 608D. (For legibility, only connections from blade servers 602A and 602B are illustrated; it should be understood that the remaining blade servers have similar connections to the DWDM multiplexer/demultiplexers.) By distributing one interconnection of the fabric topology across four separate DWDM multiplexer/demultiplexers, each blade server will retain an interconnection to the switch module through the fabric topology even if optical fiber links fail for any one DWDM multiplexer/demultiplexer. Thus, the server chassis 600 provides improved failure tolerance in a fabric topology.

It should be noted that the four DWDM multiplexer/demultiplexers of FIG. 6 are each connected to one Tx optical fiber and one Rx optical fiber, totaling eight optical fibers connected to a port of the server chassis.

Figure 7:
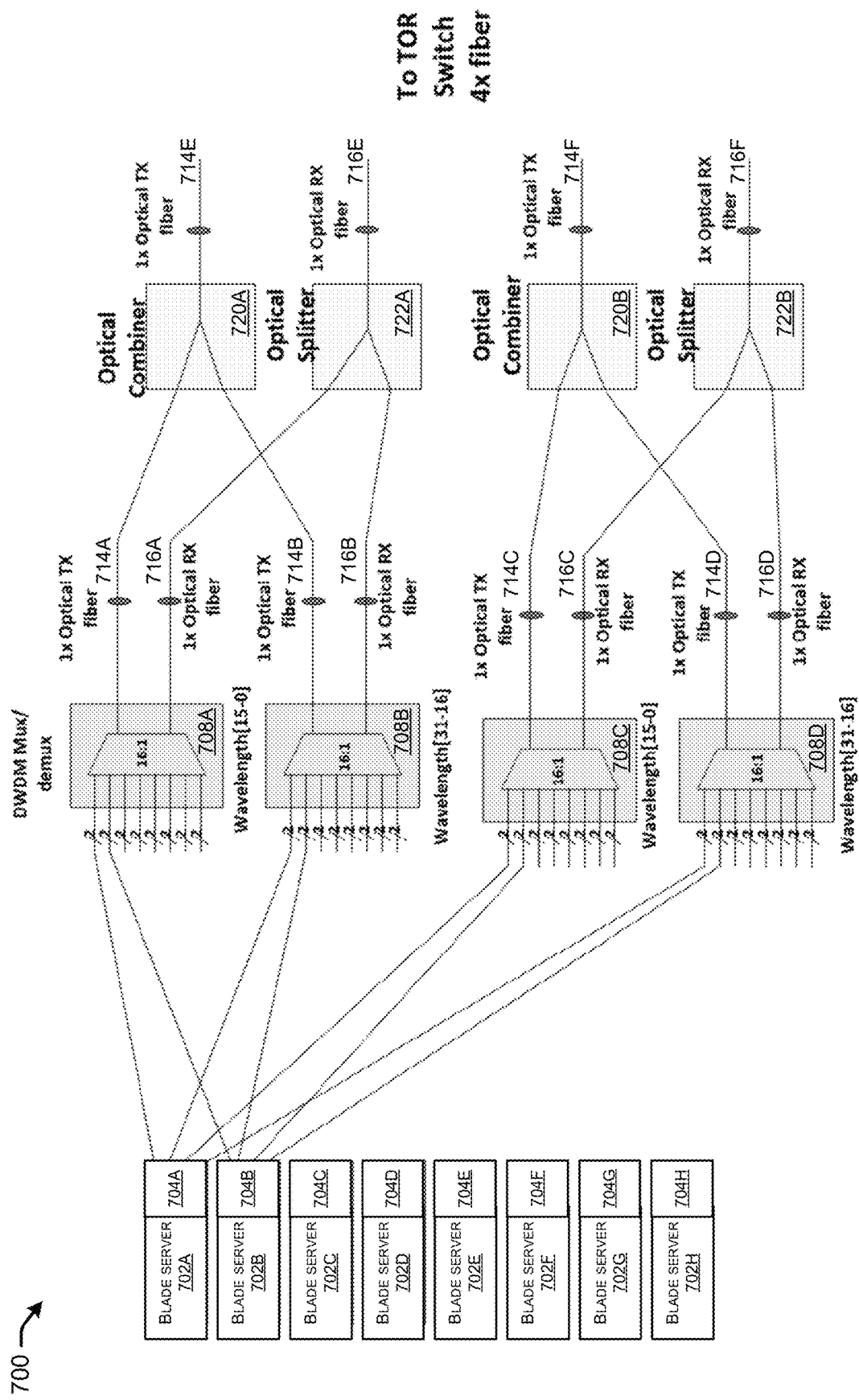
FIG. 7 illustrates a server chassis implementing a four-way distributed interconnect fabric topology which further implements optical fiber economy, according to an example embodiment of the present disclosure.

FIG. 7 illustrates a server chassis 700 implementing a four-way distributed interconnect fabric topology which further implements optical fiber economy, according to an example embodiment of the present disclosure. In the server chassis 700, blade servers 702A through 702H are each connected to eight channels of DWDM multiplexer/demultiplexers 708A, 708B, 708C, and 708D by eight optical fibers, where two fibers are connected to channels of each of 708A, 708B, 708C, and 708D. (For legibility, only connections from blade servers 702A and 702B are illustrated.) A laser source (not illustrated) of the server chassis 700 generates a laser beam made up of multiple discrete wavelengths, which transponders of the DWDM multiplexer/demultiplexer utilizes to generate wavelength-specific optical signals.

To implement optical fiber economy, it is desired to utilize one Tx optical fiber for multiple DWDM multiplexer/demultiplexers, and one Rx optical fiber for multiple DWDM multiplexer/demultiplexers. To accomplish this, the laser source is configured to generate a laser beam made up of at least as many discrete wavelengths as collective channels of a complementary set of DWDM multiplexer/demultiplexers. A complementary set of DWDM multiplexer/demultiplexers are, respectively, configured to generate wavelength-specific optical signals over mutually exclusive subsets of discrete wavelengths. The subsets of discrete wavelengths can be made mutually exclusive by, for example, varying bias voltages of respective ring resonators of different DWDM multiplexer/demultiplexers. By way of example, for a complementary set 708A and 708B, 708A is configured to generate optical signals over discrete wavelengths 0 to 15, and 708B is configured to generate optical signals over discrete wavelengths 16 to 31.

As FIG. 7 illustrates, by way of example, DWDM multiplexer/demultiplexers 708A and 708B are respectively connected to first Tx optical fibers 714A and 714B. DWDM multiplexer/demultiplexers 708C and 708D are respectively connected to first Tx optical fibers 714C and 714D. First Tx optical fibers 714A and 714B are both connected to an optical combiner 720A, such that signals transmitted over 714A and 714B are carried over a common second Tx optical fiber 714E. First Tx optical fibers 714C and 714F are both connected to an optical combiner 720B, such that signals transmitted over 714C and 714D are carried over a common second Tx optical fiber 714F.

Furthermore, 708A and 708B are respectively connected to first Rx optical fibers 716A and 716B. DWDM multiplexer/demultiplexers 708C and 708D are respectively connected to first Rx optical fibers 716C and 716D. First Rx optical fibers 716A and 716B are both connected to an optical splitter 722A, such that signals received over a common second Rx optical fiber 716E are split across over 716A and 716B. Second Rx optical fibers 716C and 716F are both connected to an optical combiner 722B, such that signals transmitted over 716C and 716D are carried over a common second Rx optical fiber 716F.

Because there is no wavelength overlap in optical signals generated by complementary sets of DWDM multiplexer/demultiplexers, transmitted optical signals from both of the complementary set are carried on a same Tx optical fiber while remaining coherent, and optical signals received by both of the complementary set are carried on a same Rx optical fiber while remaining coherent. It should be understood, however, that the full bandwidth of each blade server is distributed across each of the complementary sets, not just any one complementary set.

Figure 8:
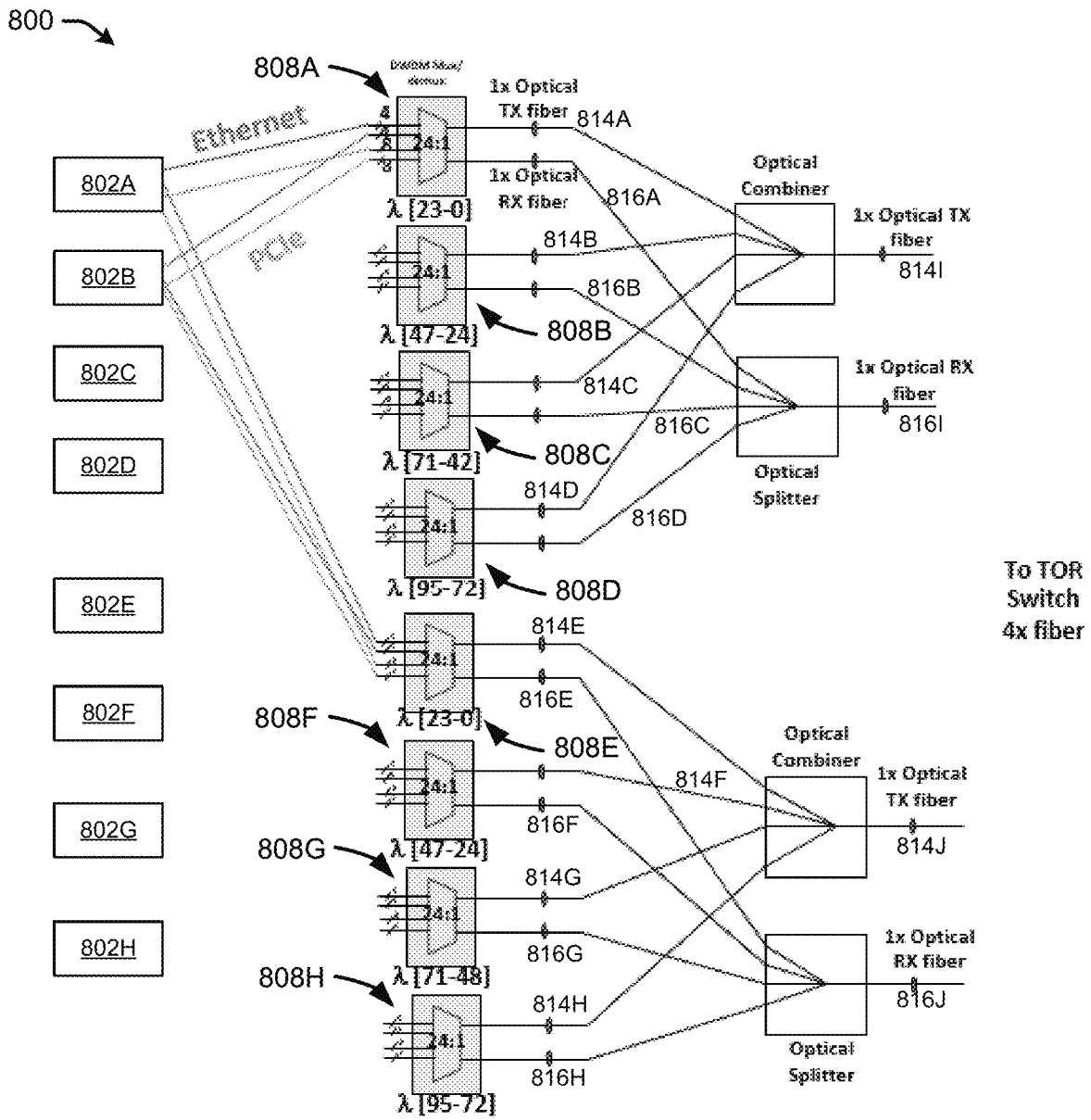
FIG. 8 illustrates a server chassis implementing an eight-way distributed interconnect fabric topology which further implements optical fiber economy and hybrid Ethernet and PCIe interface connections, according to an example embodiment of the present disclosure.

FIG. 8 illustrates a server chassis 800 implementing an eight-way distributed interconnect fabric topology which further implements optical fiber economy and hybrid Ethernet and PCIe interface connections, according to an example embodiment of the present disclosure. In the server chassis 800, blade servers 802A through 802H are each connected to twelve channels of one among DWDM multiplexer/demultiplexers 808A through 808D by twelve optical fibers, and are each connected to another twelve channels of one among DWDM multiplexer/demultiplexers 808E through 808H by another twelve optical fibers. Four fibers connect an Ethernet port to channels of one among 808A through 808D and one among 808E through 808H (here, by way of example, four respective fibers are connected to channels of 808A and 808E), and eight fibers connect a PCIe port to channels of one among 808E through 808H (here, by way of example, eight respective fibers are connected to channels of 808A and 808E). (For legibility, only connections from blade servers 802A and 802B are illustrated.)

A laser source (not illustrated) of the server chassis 800 generates a laser beam made up of multiple discrete wavelengths, which transponders of the DWDM multiplexer/demultiplexer utilizes to generate wavelength-specific optical signals. Similar to the illustrations of FIG. 7 above, the laser source is configured to generate a laser beam made up of at least as many discrete wavelengths as collective channels of a complementary set of DWDM multiplexer/demultiplexers. Due to the greater channel bandwidth per blade server required (compared to the illustration of FIG. 7) by both an Ethernet interface and a PCIe interface, a complementary set of DWDM multiplexer/demultiplexers are, respectively, configured to generate wavelength-specific optical signals over mutually exclusive subsets of 96 discrete wavelengths (rather than 32 as illustrated in FIG. 7). By way of example, for a complementary set 808A, 808B, 808C, and 808D, 808A is configured to generate optical signals over discrete wavelengths 0 to 23, 808B is configured to generate optical signals over discrete wavelengths 24 to 47, 808C is configured to generate optical signals over discrete wavelengths 48 to 71, and 808D is configured to generate optical signals over discrete wavelengths 72 to 95.

As FIG. 8 illustrates, by way of example, DWDM multiplexer/demultiplexers 808A, 808B, 808C, and 808D are respectively connected to first Tx optical fibers 814A, 814B, 814C, and 814D. DWDM multiplexer/demultiplexers 808E, 808F, 808G, and 808H are respectively connected to first Tx optical fibers 814E, 814F, 814G, and 814H. First Tx optical fibers 814A through 814D are each connected to an optical combiner 820A, such that signals transmitted over 814A through 814D are carried over a common second Tx optical fiber 814I. First Tx optical fibers 814E through 814H are each connected to an optical combiner 820B, such that signals transmitted over 814E through 814h are carried over a common second Tx optical fiber 814J.

Furthermore, 808A, 808B, 808C, and 808D are respectively connected to first Rx optical fibers 816A, 816B, 816C, and 816D. DWDM multiplexer/demultiplexers 808E, 808F, 808G, and 808H are respectively connected to first Rx optical fibers 816E, 816F, 816G, and 816H. First Rx optical fibers 816A through 816D are each connected to an optical splitter 822A, such that signals received over a common second Rx optical fiber 816I are split across 816A through 816D. Second Rx optical fibers 816E through 816H are each connected to an optical combiner 822B, such that signals received over a common second Rx optical fiber 816J are split across 816e through 816H.

Similar to the illustration of FIG. 7, because there is no wavelength overlap in optical signals generated by complementary sets of DWDM multiplexer/demultiplexers, transmitted optical signals from all four of the complementary set are carried on a same Tx optical fiber while remaining coherent, and optical signals received by all four of the complementary set are carried on a same Rx optical fiber while remaining coherent. Again, it should be understood that the full bandwidth of each blade server is distributed across each of the complementary sets, not just any one complementary set.

Example embodiments of the present disclosure additionally provide forwarding of chassis management traffic over a fabric topology established by multiplexed optical transceivers.

As described above, chassis management instructions are sent to a CMC of a server chassis, over a management bus, to configure elements of the server chassis to perform various tasks, thereby adjusting status, performance, health, and such characteristics of the server chassis. However, a dedicated switch module is responsible for forwarding chassis management instructions to various elements of the server chassis, and, consequently, out-of-band pathways such as MDIO buses are implemented in a server chassis to forward chassis management instructions from a CMC to a TOR switch.

According to example embodiments of the present disclosure, based on a fabric topology established by aggregated multiplexed optical transceivers as described above, a CMC of a server chassis can cause chassis management instructions to be forwarded over a fabric topology from a network port of any BMC of the server chassis. Such a network port can be an Ethernet interface of any BMC of the server chassis. Thus, the chassis management instructions are forwarded in-band over a network interface, rather than by an out-of-band pathway.

Figure 9:
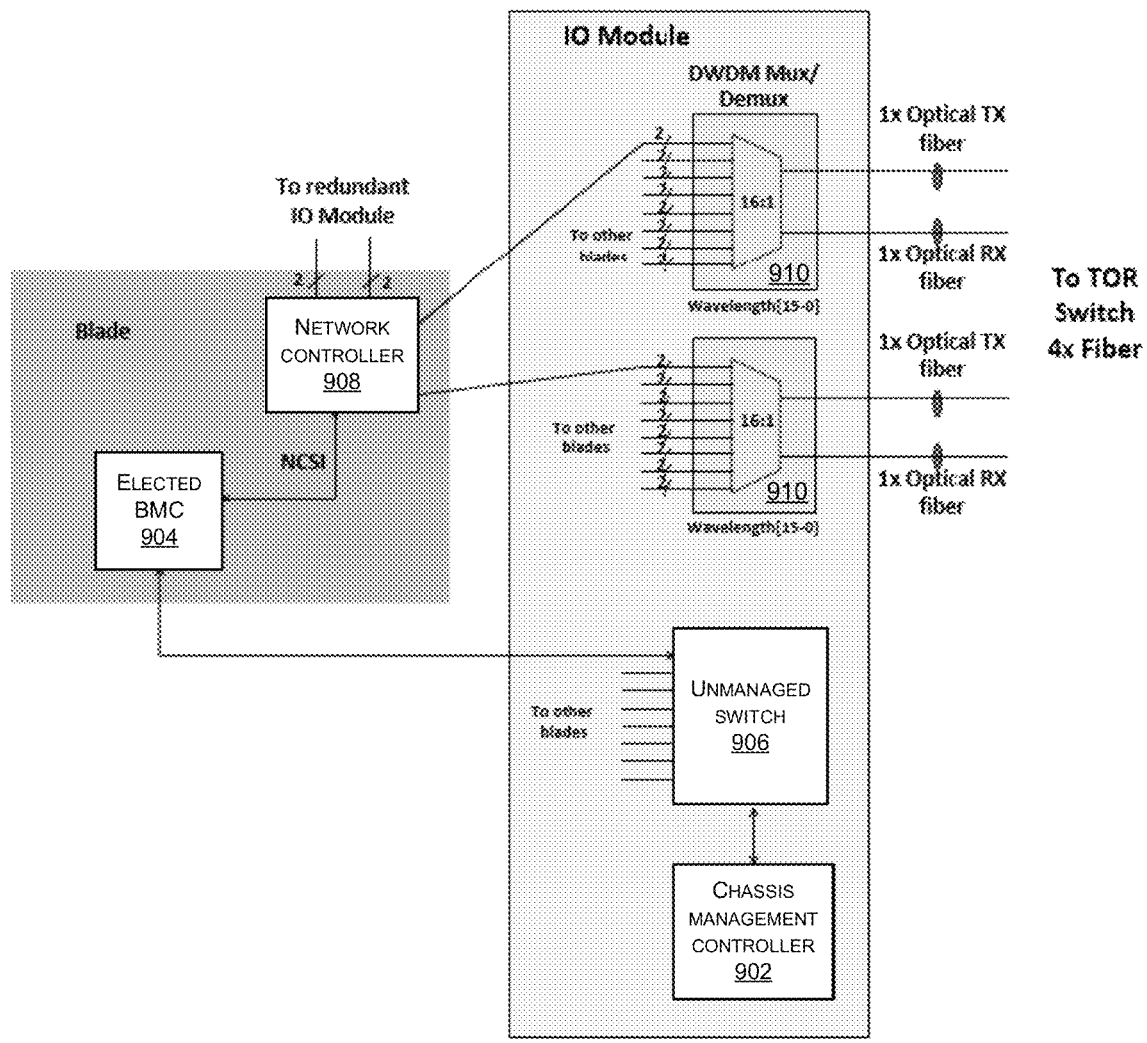
FIG. 9 illustrates a server chassis implementing forwarding of chassis management instructions over a fabric topology by an elected BMC according to example embodiments of the present disclosure.

FIG. 9 illustrates a server chassis 900 implementing forwarding of chassis management instructions over a fabric topology by an elected BMC according to example embodiments of the present disclosure. In accordance with a systems-management specification, such as IPMI as mentioned above, the CMC 902 can be configured to elect one elected BMC 904 among each BMC of the server chassis 900. The CMC 902 is configured to forward chassis management instructions to the elected BMC 904, over an unmanaged switch 906 (including chassis management instructions from any other BMCs connected to the unmanaged switch 906). In accordance with a systems-management specification, such as IPMI, the elected BMC 904 is configured to further forward chassis management instructions to a network controller 908 (which, as described above, can be an NIC or a VIC) over a network controller sideband interface ("NC-SI"), which can be implemented over interfaces such as SMBus, PCIe, and the like. An NC-SI interface configures a BMC 904 to access network ports of a network controller 908 to forward chassis management traffic in-band, in addition to sending and receiving data traffic over the network ports.

The network controller 908 is configured to forward chassis management traffic to a switch module (not illustrated) across a fabric topology established by DWDM multiplexer/demultiplexers 910.

It should further be understood that, logically, Ethernet frames forwarded to a switch module configured as described above are transported after the Ethernet frames are tagged with a VLAN tag or VN-tag (i.e., Ethernet headers of the Ethernet frames at least further include a VLAN tag or VN-tag alongside the MAC address, the source MAC address, and the EtherType), where the VLAN tag identifies a VLAN configured by the switch module, and the VN-tag identifies a virtual network interface connecting the network controller 908 and the switch module.

Figure 10:
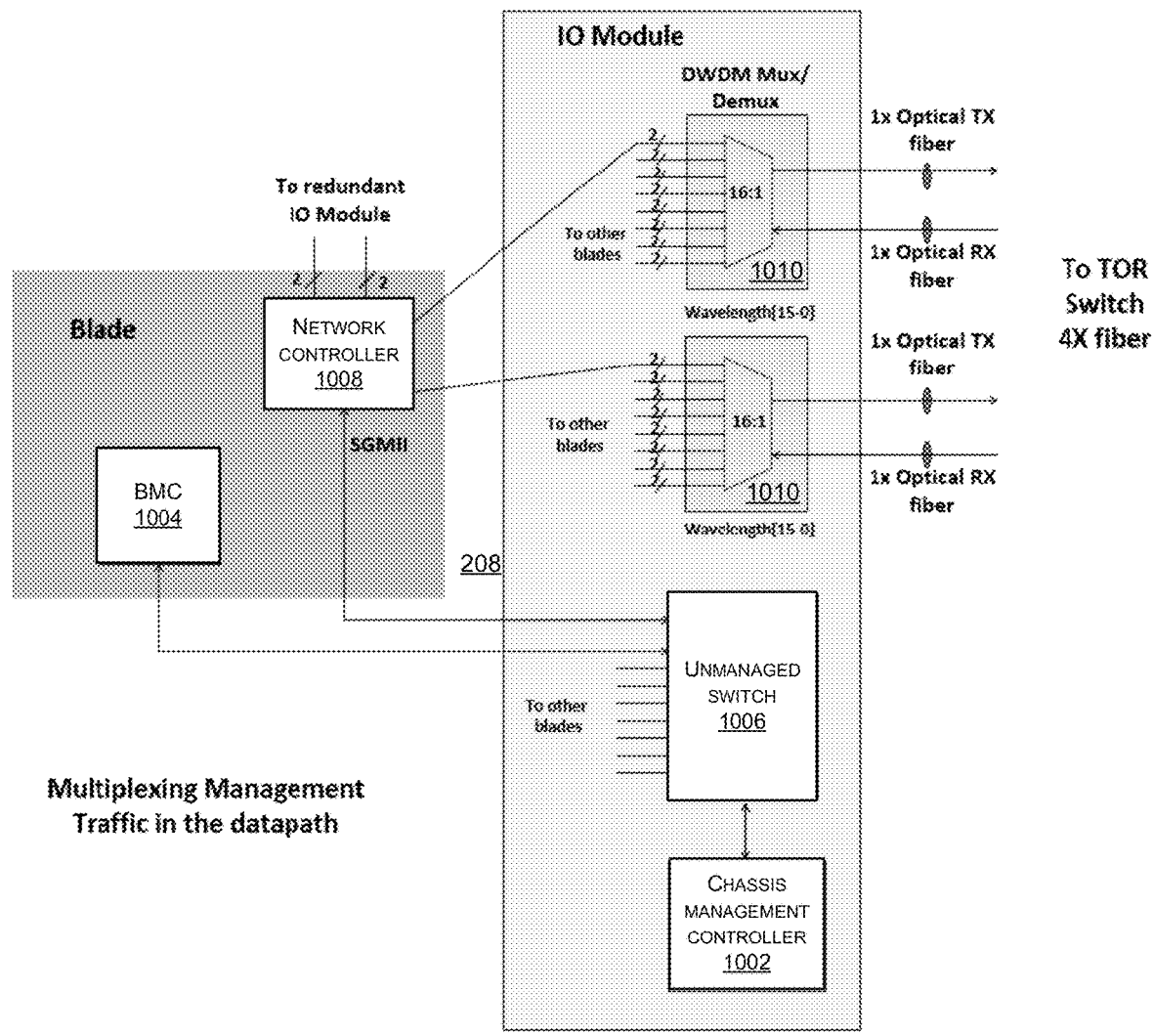
FIG. 10 illustrates a server chassis implementing forwarding of chassis management instructions over a fabric topology bypassing a BMC according to example embodiments of the present disclosure.

FIG. 10 illustrates a server chassis 1000 implementing forwarding of chassis management instructions over a fabric topology bypassing a BMC according to example embodiments of the present disclosure. In accordance with a systems-management specification, such as IPMI as mentioned above, the CMC 1002 can be configured to forward chassis management instructions, over an unmanaged switch 1006 (including chassis management instructions from any other BMCs connected to the unmanaged switch 1006), to a network controller 1008 (which, as described above, can be an NIC or a VIC) over a serial gigabit media independent interface ("SGMII"). The network controller 1008 is configured to forward chassis management traffic to a switch module (not illustrated) across a fabric topology established by DWDM multiplexer/demultiplexers 1010.

As illustrated in FIG. 10, each BMC of the server chassis is relieved from the need to forward chassis management instructions from each other BMC of the server chassis, which could result in heavy packet traffic and computational processing thereof.

Therefore, according to example embodiments of the present disclosure, multiplexed optical transceivers, such as DWDM multiplexer/demultiplexers, are aggregated in a server chassis to establish a fabric topology interconnecting blade servers to a dedicated switch module. By providing optical transceiver interconnects rather than conventional switched fabrics, blade servers installed in the server chassis can utilize not just Ethernet interfaces to connect to network segments, but also PCIe interfaces as well as a combination of Ethernet and PCIe interfaces. The aggregated optical transceivers multiplex and demultiplex wavelength-specific optical signals using a laser source, reducing power consumption over switched fabric ASICs. Servicing of the multiplexed optical transceivers is facilitated by installation and replacement of a laser source. Scaling and redundancy of fabric topology interconnects can be facilitated by selection of laser sources generating expanded ranges of discrete wavelengths. Furthermore, chassis management can be facilitated by configuring network controllers of blade servers to transport chassis management instructions over the fabric topology in-band over a network interface, rather than by an out-of-band pathway.

Figure 11:
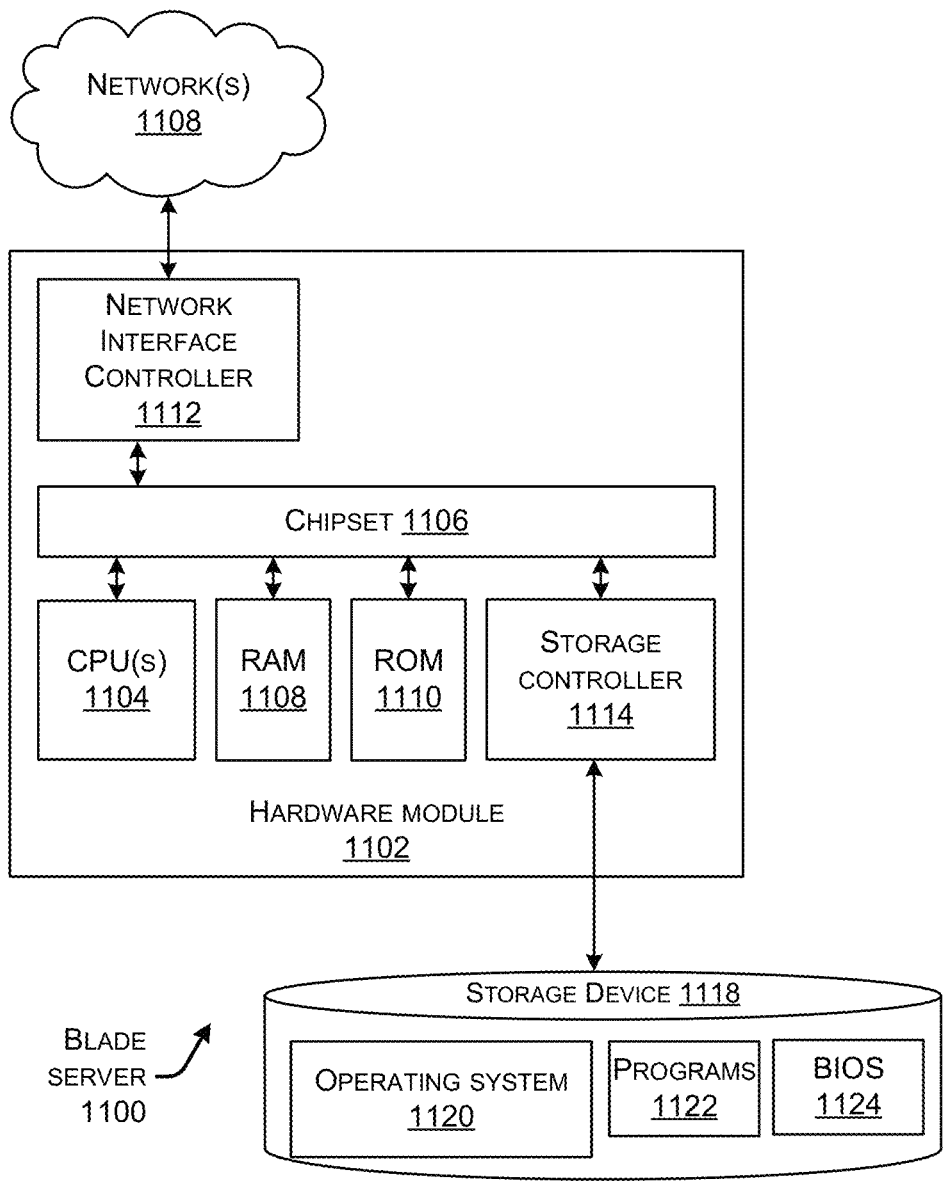
FIG. 11 shows an example computer architecture for a blade server capable of executing program components for implementing the functionality described herein.

FIG. 11 shows an example computer architecture for a blade server 1100 capable of executing program components for implementing the functionality described above. The computer architecture shown in FIG. 11 illustrates a computing device assembled from modular components, and can be utilized to execute any of the software components presented herein.

One or more hardware modules 1102 installed in a blade server 1100 may be a physical card or module to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the hardware module 1102.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the hardware module 1102. The chipset 1106 can provide an interface to a RAM 1108, used as the main memory in the hardware module 1102. The chipset 1106 can further provide an interface to a computer-readable storage medium such as a read-only memory ("ROM") 1110 or non-volatile RAM ("NVRAM") for storing basic routines that help to startup the hardware module 1102 and to transfer information between the various components and devices. The ROM 1110 or NVRAM can also store other software components necessary for the operation of the hardware module 1102 in accordance with the configurations described herein.

The hardware module 1102 can operate in a networked environment using logical connections to remote computing devices and computer systems through a network, such as the broadcast domain as described above. The chipset 1106 can include functionality for providing network connectivity through a NIC 1112, such as a gigabit Ethernet adapter. The NIC 1112 is capable of connecting the hardware module 1102 to other computing devices over the network 408. It should be appreciated that multiple NICs 1112 can be present in the hardware module 1102, connecting the blade server 1100 to other types of networks and remote computer systems.

The hardware module 1102 can be connected to a storage device 1118 that provides non-volatile storage for the hardware module 1102. The storage device 1118 can store an operating system 1120, programs 1122, a BIOS 1124, and data, which have been described in greater detail herein. The storage device 1118 can be connected to the hardware module 1102 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The hardware module 1102 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the hardware module 1102 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 1102 can further read information from the storage device 1118 by detecting the physical states or characteristics of one or more particular locations within the physical storage units.

In addition to the mass storage device 1118 described above, the hardware module 1102 can have access to other computer-readable storage media to store and retrieve information, such as program modules, data structures, or other data. It should be appreciated by those skilled in the art that computer-readable storage media is any available media that provides for the non-transitory storage of data and that can be accessed by the hardware module 1102. In some examples, the operations performed by a switch of the network overlay, and or any components included therein, may be supported by one or more devices similar to the hardware module 1102. Stated otherwise, some or all of the operations performed by a switch of the network overlay, and or any components included therein, may be performed by one or more hardware modules 1102 operating in a networked, distributed arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the hardware module 1102. According to one embodiment, the operating system comprises the WINDOWS SERVER operating system and derivatives thereof from MICROSOFT CORPORATION of Redmond, Washington. According to another embodiment, the operating system comprises the ENTERPRISE LINUX operating system from RED HAT, INC. of Raleigh, North Carolina. According to another embodiment, the operating system comprises the SUSE LINUX operating system from SUSE, S.A. of Luxembourg. According to another embodiment, the operating system comprises the VSPHERE operating system from VMWARE, INC. of Palo Alto, California. It should be appreciated that other operating systems can also be utilized. The storage device 1118 can store other system or application programs and data utilized by the hardware module 1102.

In one embodiment, the storage device 1118 or other computer-readable storage media is encoded with computer-executable instructions which, when loaded into a computer, transform the computer from a general-purpose computing system into a special-purpose computer capable of implementing the embodiments described herein. These computer-executable instructions transform the hardware module 1102 by specifying how the CPUs 1104 transition between states, as described above. According to one embodiment, the hardware module 1102 has access to computer-readable storage media storing computer-executable instructions which, when executed by the hardware module 1102, perform the various processes described above with regard to FIGS. 1-10. The hardware module 1102 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A server chassis, comprising a plurality complementary set of dense wavelength division multiplexing ("DWDM") multiplexer/demultiplexers, a plurality of blade servers, and a laser source configured to generate a laser beam comprising a plurality of discrete wavelengths;
    wherein the complementary set of DWDM multiplexer/demultiplexers each comprises a plurality of channels, a respective transponder for each channel, and a respective optical modulator for each channel, each transponder of a DWDM multiplexer/demultiplexer being configured to receive optical signals from a plurality of network ports of blade servers, and each optical modulator of a DWDM multiplexer/demultiplexer being configured to modulate a received optical signal with the laser beam to yield a wavelength-specific optical signal over respectively mutually exclusive subsets of discrete wavelengths;
    wherein each blade server of the plurality of the blade servers is connected by one or more network ports to each DWDM multiplexer/demultiplexer of the complementary set of DWDM multiplexer/demultiplexers, the one or more network ports comprising an Ethernet interface and a PCIe interface;
    wherein the plurality of discrete wavelengths comprises at least as many wavelengths as the plurality of channels; and
    wherein the plurality of discrete wavelengths comprise at least as many discrete wavelengths as channels of a DWDM multiplexer/demultiplexer.

2. The server chassis of claim 1, further comprising:
    a transmitting optical fiber connected to at least one of the complementary set of DWDM multiplexer/demultiplexers;
    a receiving optical fiber connected to at least one of the complementary set of DWDM multiplexer/demultiplexers; and
    an optical port;
    wherein the transmitting optical fiber and the receiving optical fiber are each connected to the optical port.

3. A plurality of dense wavelength division multiplexing ("DWDM") multiplexer/demultiplexers;
    wherein the plurality of DWDM multiplexer/demultiplexers is installed in a server chassis;
    wherein the plurality of DWDM multiplexer/demultiplexers each comprises a plurality of channels, a respective transponder for each channel, and a respective optical modulator for each channel, each transponder of a DWDM multiplexer/demultiplexer being configured to receive optical signals from a plurality of network ports of blade servers, and each optical modulator of a DWDM multiplexer/demultiplexer being configured to modulate a received optical signal with the laser beam to yield a wavelength-specific optical signal over respectively mutually exclusive subsets of discrete wavelengths;
    wherein the laser beam comprises a plurality of discrete wavelengths comprising at least as many discrete wavelengths as channels of a DWDM multiplexer/demultiplexer; and
    wherein each DWDM multiplexer/demultiplexer of the plurality of DWDM multiplexer/demultiplexers is configured to receive one or more network connections from an Ethernet interface and one or more network connections from a PCIe interface.

4. The plurality of DWDM multiplexer/demultiplexers of claim 3, wherein each DWDM multiplexer/demultiplexer is connected to a transmitting optical fiber and to a receiving optical fiber; and
    the transmitting optical fiber and the receiving optical fiber are each respectively connected to an optical port of a server chassis.

5. The plurality of DWDM multiplexer/demultiplexers of claim 3, wherein a plurality of blade servers is installed in the server chassis; and
    wherein each DWDM multiplexer/demultiplexer of the plurality of DWDM multiplexer/demultiplexers is configured to be connected to one or more network ports of each blade server of the plurality of the blade servers.

6. The plurality of DWDM multiplexer/demultiplexers of claim 5, wherein the one or more network ports comprise an Ethernet interface and a PCIe interface.

\* \* \* \* \*